United States Patent [19]

Barton et al.

[11] Patent Number: 4,776,216

[45] Date of Patent: Oct. 11, 1988

[54] PROGRAMMABLE JET BLADE EXCITATION SYSTEM

[75] Inventors: Serge P. Barton, Oviedo; Paul F. Rozelle, Fern Park; Michael Twerdochlib, Oviedo, all of Fla.

[73] Assignee: Westinghouse Electric Corp., Pittsburgh, Pa.

[21] Appl. No.: 18,384

[22] Filed: Feb. 24, 1987

[51] Int. Cl.[4] ............................................. G01H 11/00
[52] U.S. Cl. ........................................ 73/660; 73/671
[58] Field of Search ................. 73/671, 665, 661, 660, 73/577, 579

[56] References Cited

U.S. PATENT DOCUMENTS 2,682,167  6/1954  Gamarekian ........................... 73/671
2,738,671  3/1956  Fiske, Jr. et al. ...................... 73/671
3,289,073  11/1966  Loeffler ................................. 73/660

Primary Examiner—Tom Noland
Assistant Examiner—Louis M. Arana
Attorney, Agent, or Firm—D. C. Abeles

[57] ABSTRACT

System and method for characterizing the resonant responses of a plurality of rotating blades in a turbo machine. The system comprises a plurality of controllable fluid jets disposed about a blade row for exciting rotating blades with selectable frequencies of vibration. The sequential excitation of blades at a plurality of narrowly spaced frequencies and the simultaneous sensing of blade responses sufficiently resolves the resonant center frequencies and harmonics thereof in order to detect changes in characteristic blade resonances.

6 Claims, 8 Drawing Sheets

| N | -0.25 | -0.165 | -0.1 | -0.05 | 0 | 0.05 | 0.1 | 0.165 | 0.25 |
|---|---|---|---|---|---|---|---|---|---|
| 1 | 1.25 | 1.17 | 1.10 | 1.05 | 1.00 | 0.95 | 0.90 | 0.84 | 0.75 |
| 2 | 2.50 | 2.33 | 2.20 | 2.10 | 2.00 | 1.90 | 1.80 | 1.67 | 1.50 |
| 3 | 3.75 | 3.50 | 3.30 | 3.15 | 3.00 | 2.85 | 2.70 | 2.51 | 2.25 |
| 4 | 5.00 | 4.66 | 4.40 | 4.20 | 4.00 | 3.80 | 3.60 | 3.34 | 3.00 |
| 5 | 6.25 | 5.83 | 5.50 | 5.25 | 5.00 | 4.75 | 4.50 | 4.18 | 3.75 |
| 6 | 7.50 | 6.99 | 6.60 | 6.30 | 6.00 | 5.70 | 5.40 | 5.01 | 4.50 |
| 7 | 8.75 | 8.16 | 7.70 | 7.35 | 7.00 | 6.65 | 6.30 | 5.85 | 5.25 |
| 8 | 10.00 | 9.32 | 8.80 | 8.40 | 8.00 | 7.60 | 7.20 | 6.68 | 6.00 |
| 9 | 11.25 | 10.49 | 9.90 | 9.45 | 9.00 | 8.55 | 8.10 | 7.52 | 6.75 |
| 10 | 12.50 | 11.65 | 11.00 | 10.50 | 10.00 | 9.50 | 9.00 | 8.35 | 7.50 |

FIG. 8.

PROGRAMMABLE JET BLADE EXCITATION SYSTEM

FIELD OF THE INVENTION

This application relates in general to turbomachinery and in particular to an improved method of characterizing blade vibration resonances in one or more rows of rotating blades of a turbomachine.

BACKGROUND OF THE INVENTION

In high speed turbomachines, e.g. steam or gas turbines, multiple turbine stages, each comprising a plurality of circumferentially distributed blades forming a turbine wheel, are arranged axially along a rotatable shaft. The turbine wheels rotate in response to the force of a high pressure fluid flowing axially through the machine and impinging on the blades of the wheels. Natural resonant frequencies of the blades may coincide with or be excited by some rotational speeds and integral harmonics thereof. Blade resonances excited at multiples of the shaft rotational frequency may create stresses which break one or more blades and cause extensive damage, thus shutting the machine down and requiring extensive repair.

To avoid resonances, blades in the low pressure sections of steam turbines are tuned to avoid excitation at multiples of operating speed. This tuning is achieved by careful analysis during blade design. Detailed testing is performed prior to operation of a machine to ensure that new blades do not resonate during normal operation. A rotating test of a row of turbine blades comprises excitation of the blades with a fluid jet while measuring the vibratory response of several blades with strain gages to determine the frequencies of resonance, that is the excitation frequencies at which the greatest response occurs. Such a steady fluid jet excites only frequencies which are integral multiples of shaft rotational speed. The shaft speed must be varied in order to vary the excitation frequency. Stringent quality control practices are then followed to assure that the blades are manufactured as designed. These quality control measures depend upon laboratory testing to set manufacturing tolerances and to verify blade tuning. However, because individual evaluation of manufactured blades can be time intensive, it has not been practical to laboratory test all blades under normal rotating conditions in order to confirm proper blade tuning. On the other hand, blade testing in non-operational environments has been an imperfect alternative because it requires correction of test data in order to predict vibratory responses under rotating conditions. These adjustments are necessary because resonant frequencies vary with changes in blade stress resulting from centripetal forces during operation.

It is also desirable to monitor rotating blades during operation in order to identify vibration problems which develop after a turbomachine is put into use. This on-line evaluation is necessary in part because evaluations performed prior to actual use, even rotational tests, do not subject the blades to the same forces, temperatures and pressure conditions which are experienced during field operations.

Continuous monitoring of blade vibrations is also important in order to detect shifts in resonant frequencies which signal structural changes. For example, a propagating crack will cause the resonant frequencies of a blade to decrease. It is desirable to detect these changes before the blade becomes resonant at the shaft rotational speed or a harmonic thereof. Otherwise the vibrating blade may undergo dangerously high stresses. Other factors also cause resonant frequencies of the blades to change with time. For example, corrosion and erosion of airfoil areas may also change resonant frequencies and changes in riveted or welded joints by which some blading assemblies are fastened together and to the turbine shaft may alter resonant frequencies.

The model frequencies of rotating blades also depend on the fit of blades in the rotor attachment grooves which secure the blades in place. The dynamic effect of high speed rotation normally improves the securement of a blade because centripetal forces tighten the connection. This dynamic loading at operating speed is difficult to simulate. The frequency response of a blade is a strong function of operating speed, because centripetal forces both stiffen the blades and enforce their connection to the rotor. The resulting variation of resonant frequency with speed must be determined if stationary test data are used.

Although stationary testing in combination with appropriate correction data can provide meaningful information for new blades, corrosion in the rotor attachment grooves is known to affect blade securement and change both the stiffness of a blade and its damping characteristics. Thus, factory test data do not necessarily correspond to the characteristics of blades found in older machinery. Furthermore, similar adjustments to stationary test data may not result in the correct dynamic characteristics of retrofit blades, again because age effects alter the original tolerances in rotor attachment grooves. These variable physical changes cannot be fully accounted for without direct measurements.

Although previous methods of performing evaluations have successfully eliminated some serious vibration problems, it is desirable to perform reliable and comprehensive monitoring in order to further avoid the above described problems. In the past there has been a very limited capability for monitoring on-line blade vibrations, but with recent advances in blade vibration monitoring, fast, long-lived and cost-effective monitoring systems are now able to provide and continuously update blade vibration information for entire rows of blades in turbomachines. An exemplary system is disclosed in U.S. Pat. No. 4,573,358 assigned to the assignee of the present invention.

With the advent of improved systems for blade vibration monitoring it is desirable to periodically measure blade resonances in operating equipment in order to detect structural changes. In the past this has not been possible because on-line monitoring of blade vibrations has been limited to passive evaluations, i.e., to the detection of naturally occurring resonances which correspond to the frequency of shaft rotation or harmonics thereof. A disadvantage of passive evaluation is, of course, that the shifts in resonant frequencies which signal structural defects may not be discoverable before extensive damage results. One reason that shifts in blade resonances are not monitored on-line is that there has not been available a method for exciting the blades of a turbomachine at variable frequencies during normal operation. Clearly such a method in combination with a suitable blade vibration monitoring system would provide reliable and accurate data acquired under the most realistic conditions.

SUMMARY OF THE INVENTION

Among the several objects of the invention may be noted the provision of a system for exciting rotating blades of a turbomachine with selectable vibration frequencies, a method for operating a system for exciting rotating blades of a turbomachine with selectable vibration frequencies and an improved method for characterizing the frequencies of resonant vibration in a plurality of rotating blades in a turbomachine which overcomes the above discussed disadvantages, limitations or undesirable features, as well as others, of the prior art; the provision of such system and method for exciting rotating blades with vibrations which, when used in combination with other equipment such as a blade vibration monitoring system, provides for a comprehensive measurement, diagnosis and detection of blade vibration problems not heretofore available; the provision of such a system and method in which both synchronous and nonsynchronous blade vibration frequencies can be selectively excited in a safe and controllable manner while the turbo-machine operates at synchronous speed, such system and method allowing for the measurement and assessment of frequency shifts and amplitude changes in characteristic blade resonances which may be caused by cracking, thermal gradients, material changes, deposits, corrosion and other factors; the provision of such a system and method which simplify and increase the speed and accuracy of tests for characterizing the resonant responses of turbomachine blades; and the provision of such a system and method which reduce the number of blade vibration sensors needed to monitor a rotating blade row. These as well as other objects and advantageous features of the present invention will be in part apparent and in part pointed out hereinafter.

In general, a system in one form of the invention is provided with a plurality of controllable fluid jets, positioned about a blade row or turbine wheel in a turbomachine, from which a fluid can be selectively directed onto the rotating blades for exciting the blades at selectable vibration frequencies in order to identify blade resonances.

Also in general, a method is provided in one form of the invention for exciting rotating blades at various vibration frequencies in order to induce resonant vibrations.

Further in general, a method is provided for performing a comprehensive characterization of blade resonant frequencies in a plurality of rotating blades. The method evaluates resonances by exciting the blades at non-integer as well as integer multiples of synchronous turbine speed and may be used to evaluate resonant frequencies at any desired resolution. The method allows for testing all the rotating blades in a blade row of an operating turbomachine at synchronous speed thus providing a means for evaluating installed blades in new machinery and older machinery under normal operating conditions.

BRIEF DESCRIPTION OF THE DRAWINGS

FIG. 8 contains a table of selected blade vibration frequencies and harmonics thereof which can be induced by one embodiment of the inventive system and method.

DETAILED DESCRIPTION

The inventive methods and apparatus are described by way of example with particular application to the vibratory excitation of a row of blades in a steam turbine, but it is to be understood that the inventions are suitable for evaluation of bladed turbomachines generally.

Figure 1:
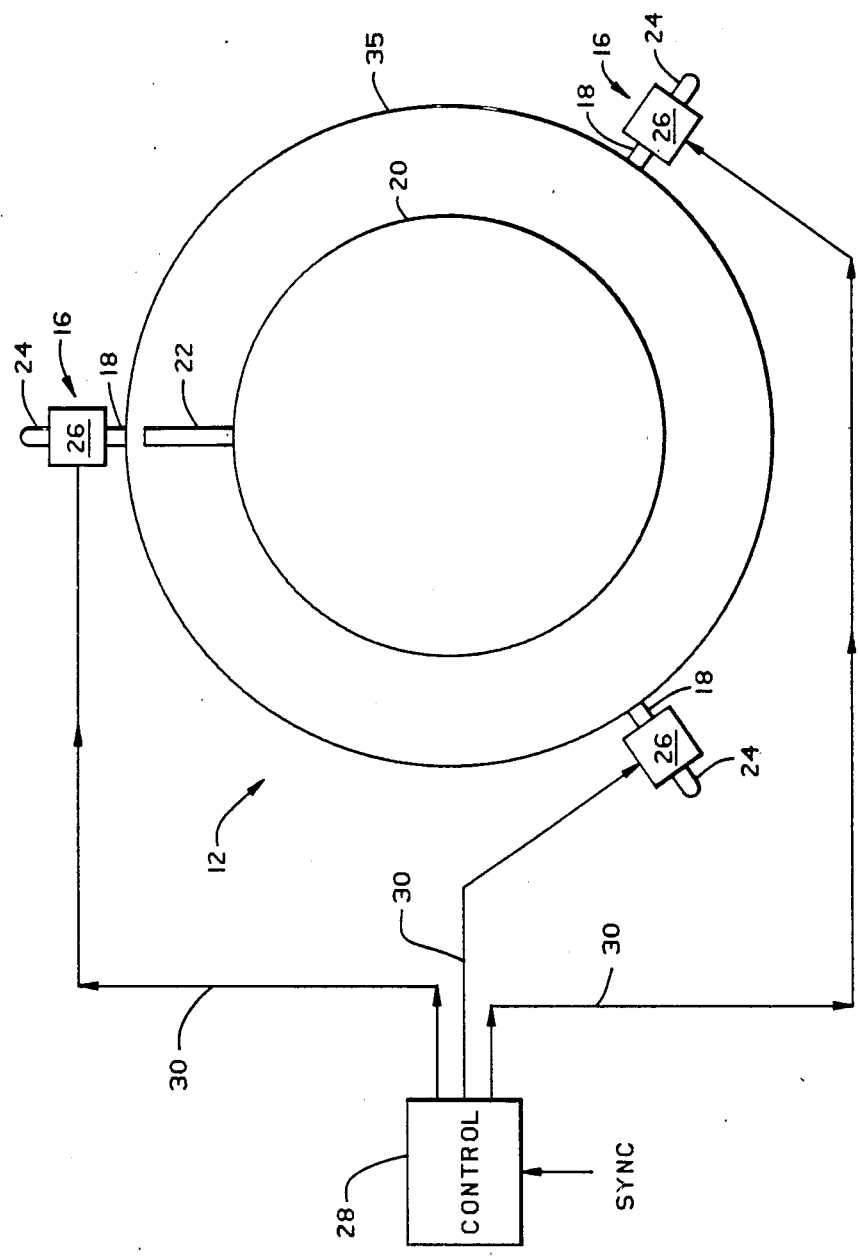
FIG. 1 is a simplified schematic illustration of a turbine cross-section showing a relative arrangement of one embodiment of the inventive programmable controllable fluid jet blade excitation system.

Referring to FIG. 1, there is illustrated a schematic of the inventive programmable fluid jet blade excitation system coupled to a turbine 12. The system includes a plurality of controllable fluid jets 16 disposed about a cylindrically shaped turbine casing 35. Each jet 16 comprises an inlet supply line 24, an actuator 26 incorporating a controllable valve (not shown) for selectively blocking line 24 and an outlet nozzle 18 for directing fluid onto blades of the turbine. A high pressure steam supply (not shown) is coupled to each jet 16 through supply lines 24. Actuators 26 controllably open and close the valves internal to the jets in order to selectively direct a pressurized fluid stream through nozzles 18. Each jet is positioned about a turbine rotor disk 20 to which is attached a plurality of turbine blades forming a turbine wheel. For ease of understanding, only one blade 22 is illustrated and only three equally spaced jets 16 are shown. Blade excitation occurs by virtue of impact of the fluid from nozzles 18 against the rotating blade.

It is to be understood that while this illustrative jet arrangement may be used to simultaneously excite all of the blades in a row, still other jet arrangements may be used to successfully implement the inventive method. For example, a single jet may be used to excite the rotating blades at resonant frequencies, but because a blade would not receive excitation pulses more frequently than once per revolution the decay of blade vibration amplitude between excitations could make detection of resonant frequencies difficult. Nor is it necessary that the jets 16 be uniformly spaced in order to induce vibratory excitations at predetermined frequencies. In fact, unequal spacing of the jets may be desirable in applications where a complete circle of jets would be difficult or expensive to install.

The actuators 26 are controlled by a digital controller 28 of a type well known in the art such as, for example, a programmable controller. For a given arrangement of jets 16, appropriately phased timing signals may be programmed into digital controller 28 in order to induce desired vibratory excitation frequencies in blades 22 by contact between the blades and the fluid stream from the jets. Digital controller 28 selectively provides control signals along control lines 30 to each actuator 26 in order to selectively open and close the valve within the jet so that a fluid stream is "fired" at each blade to generate desired excitation frequencies. Controller 28 is synchronized with blade rotational velocity by a SYNC signal provided by a shaft speed sensor (not shown) of a type well known in the art. The arrangement of a controllable jet relative to a blade row is further described in FIG. 2 wherein a vibration sensor 40 is also illustrated adjacent the rotating blade row in order to detect blade vibrations induced by the jets.

Figure 2:
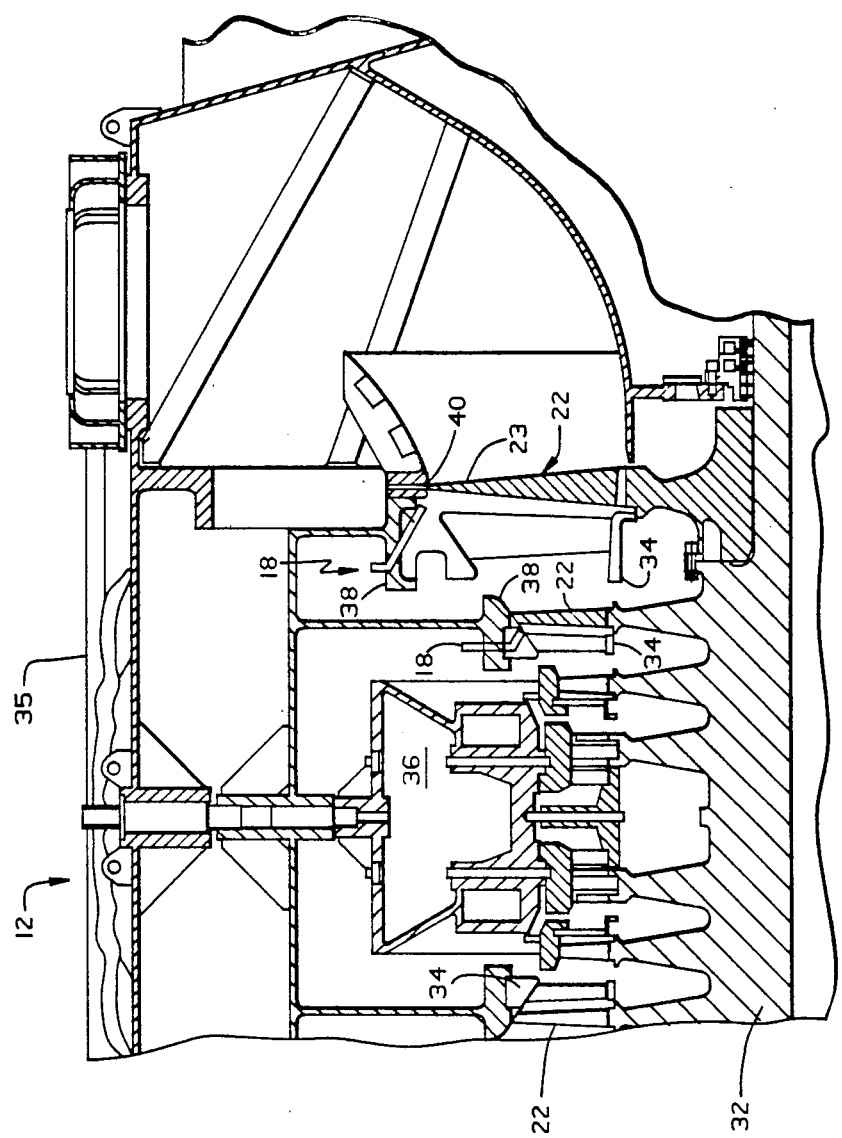
FIG. 2 is a partial cross-section of a steam turbine illustrating the arrangement of a programmable fluid jet relative to a blade row.

FIG. 2 is a partial cross-section of a longitudinal section of a low pressure steam turbine 12 in which the present invention is applied. The turbine section includes a casing 35 surrounding and supporting a rotatable shaft 32 to which is attached a plurality of rows of blades 22. Each row of rotating blades is positioned adjacent a corresponding row of stationary blades 34, a row of blades and a row of stationary blades forming a turbine stage. Pressurized steam enters the turbine through an annular chamber 36 and is directed through the turbine stages. The stationary blades 34 effect the direction of steam flow onto blades 22. The present invention is shown in conjunction with the last two turbine stages to the right hand side of FIG. 2. The steam jet nozzle 18 passes through a support member 38 for stationary blades 34 and terminates adjacent a radially outer tip 23 of blade 22. The control actuator 26 and inlet 24 for the jets 16 are preferrably positioned outside turbine casing 35 and are not shown in FIG. 2. During turbine operation, the steam through the turbine stages reacts against blades 22 causing rotation of shaft 32. If an actuator 26 is energized to allow a high pressure steam pulse to be injected through nozzle 18, the rotating blade will impact against the steam pulse. The resulting vibration in the blade 22 can then be detected by sensor 40 which is attached to a nonrotating structural portion of the turbine adjacent the tip 23 of blade 22. The connections from sensor 40 to external of the turbine are well known and not shown. The sensor 40 may be any of a number of suitable sensors such as, for example, electromagnetic probes.

In a preferred embodiment, the controllable jets 16 are equally spaced in a circle about a blade row. In this embodiment, sequential and periodic firing of the three jets 16 occurs at a predetermined frequency referred to herein as the jet cycling speed. It should be noted that when a jet is "fired", the internal valve is opened so that a fluid stream is directed into the blade rotational path. Several consecutive blades may be excited by a continuous stream. The jet nozzles 18 may be oriented along turbine radius lines since the major force exerted on the blades is the impact with the fluid stream caused by the rotational velocity of the blades.

In the following description, J represents the apparent rotational velocity of the jets as a fraction of the speed and in the direction of blade rotation, i.e., by controlling the jet firing times, the jet appears to rotate. When the rotational velocity of a jet is the same as the blade rotational velocity, J = 1; when jet rotation is counter to blade rotation, J is less than 0; and when jet rotation is in the direction of blade rotation, J is greater than O. By way of example, for R=60 hz and a jet cycling speed of 36 Hz, J=0.1. When implementing the method, controller 28 may be programmed to generate desired jet cycling speeds based on one or more selected values of J.

The vibratory frequencies $F_n$ which are excitable by the jets are given by $$F_n = nR(1-J),$$

where n is an integer and R is the turbine rotational frequency. $F_0$ is the steady, non-oscillatory component of the force. Fundamental vibratory frequencies $F_1$ correspond to n=1 and harmonics of $F_1$ occur for other values of n.

Figure 3:
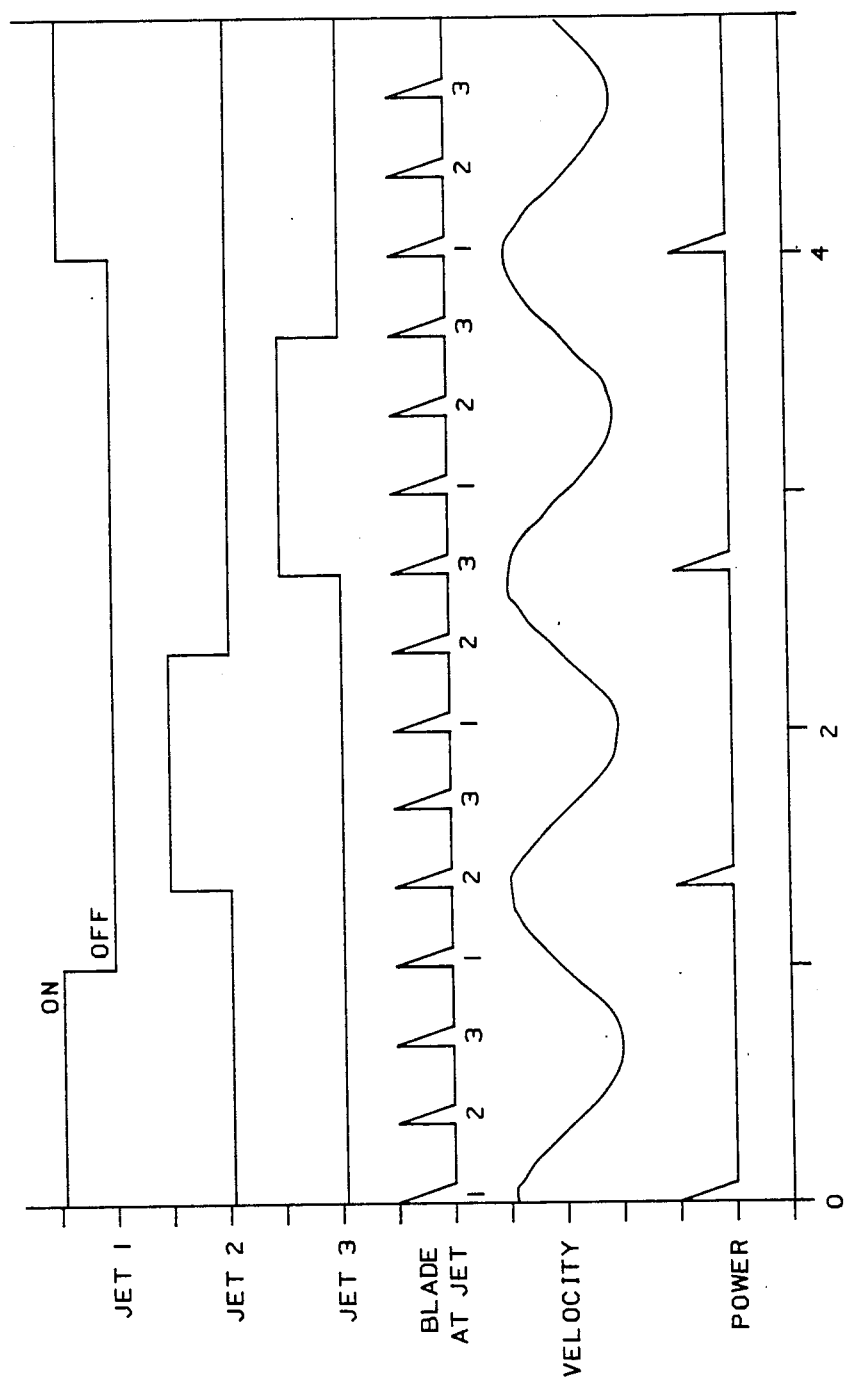
FIGS. 3 through 7 illustrate timing diagrams for operation of the fluid jets relative to a blade for initiating various excitation frequencies.
Figure 4:
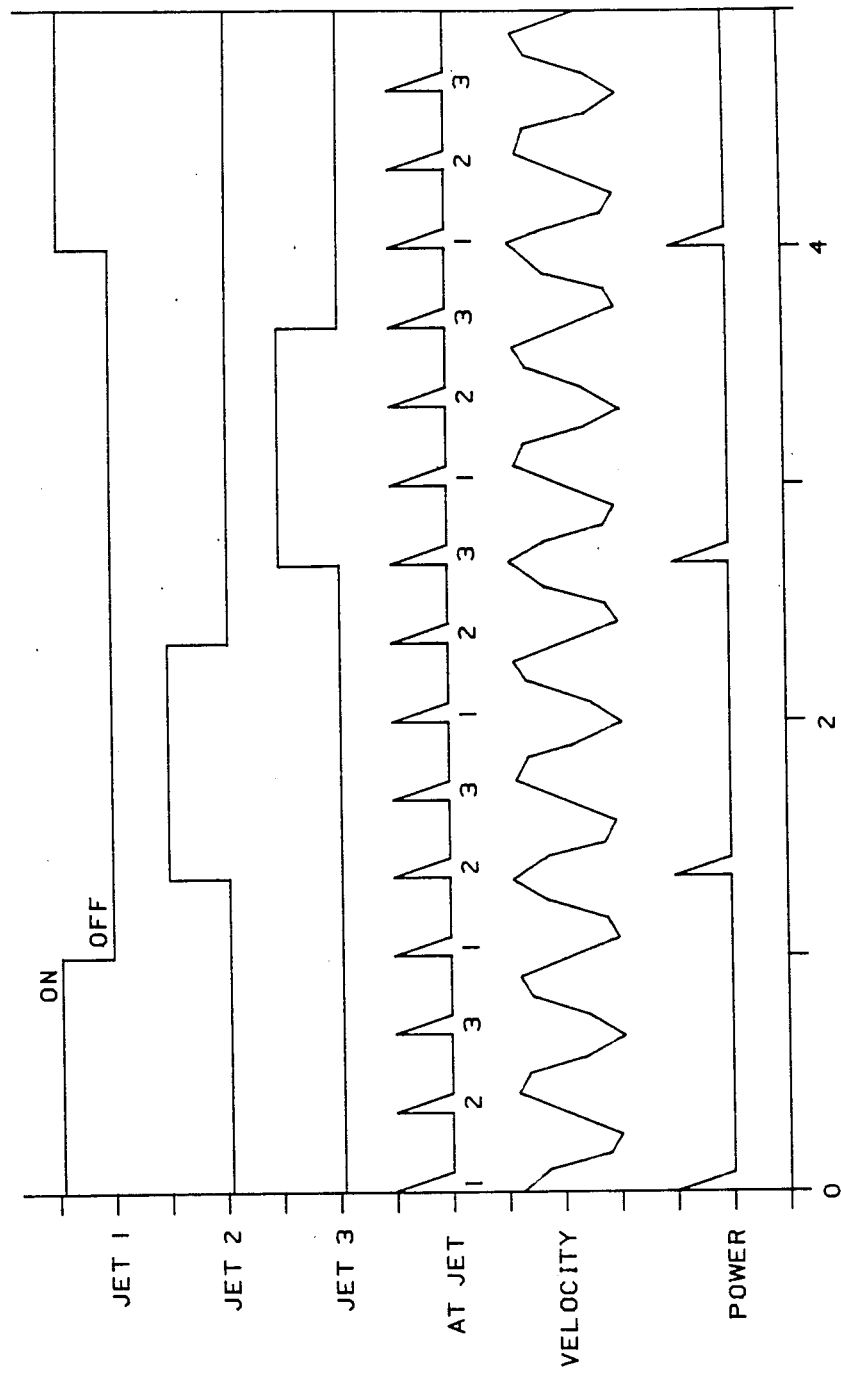
Figure 5:
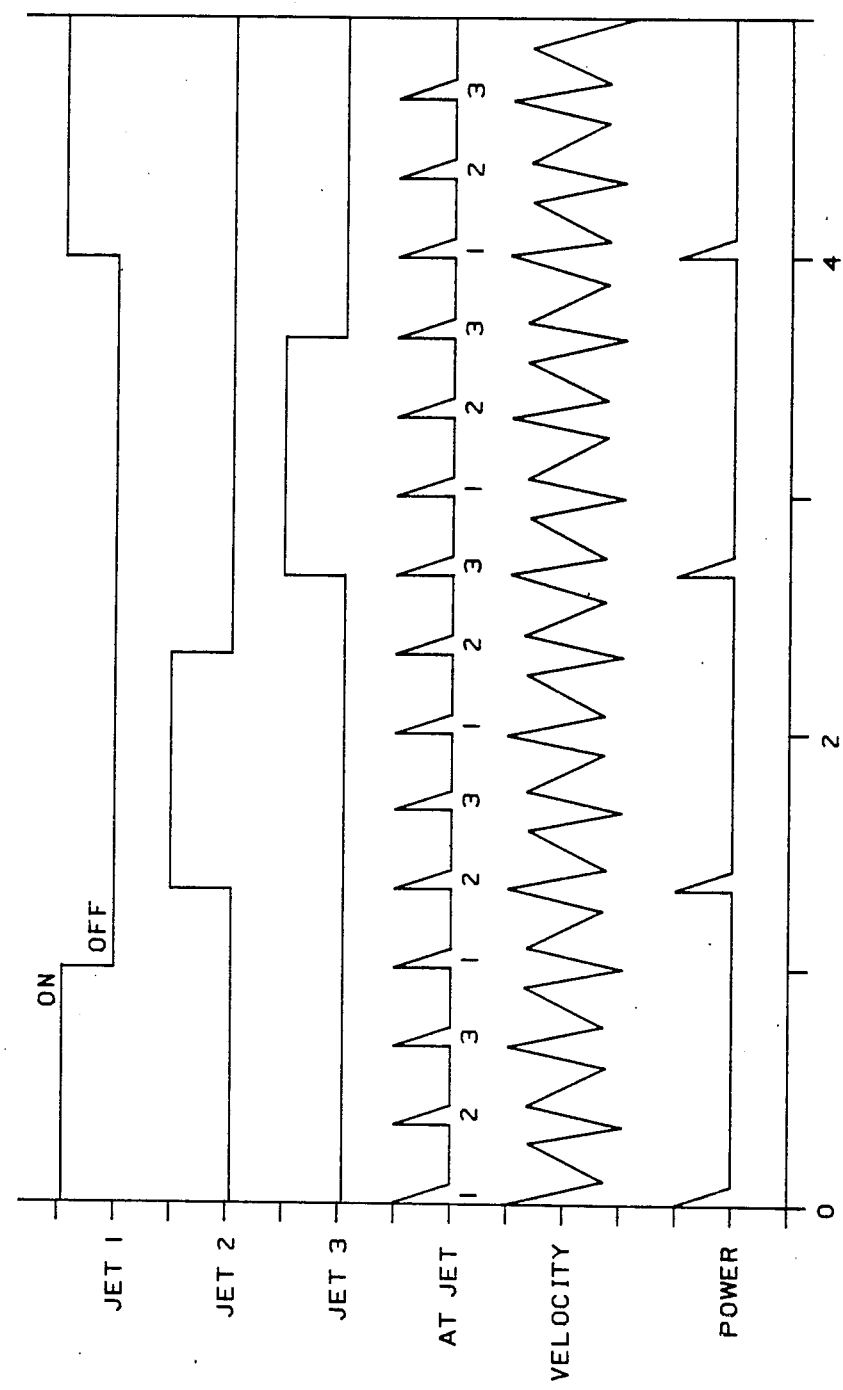
Figure 6:
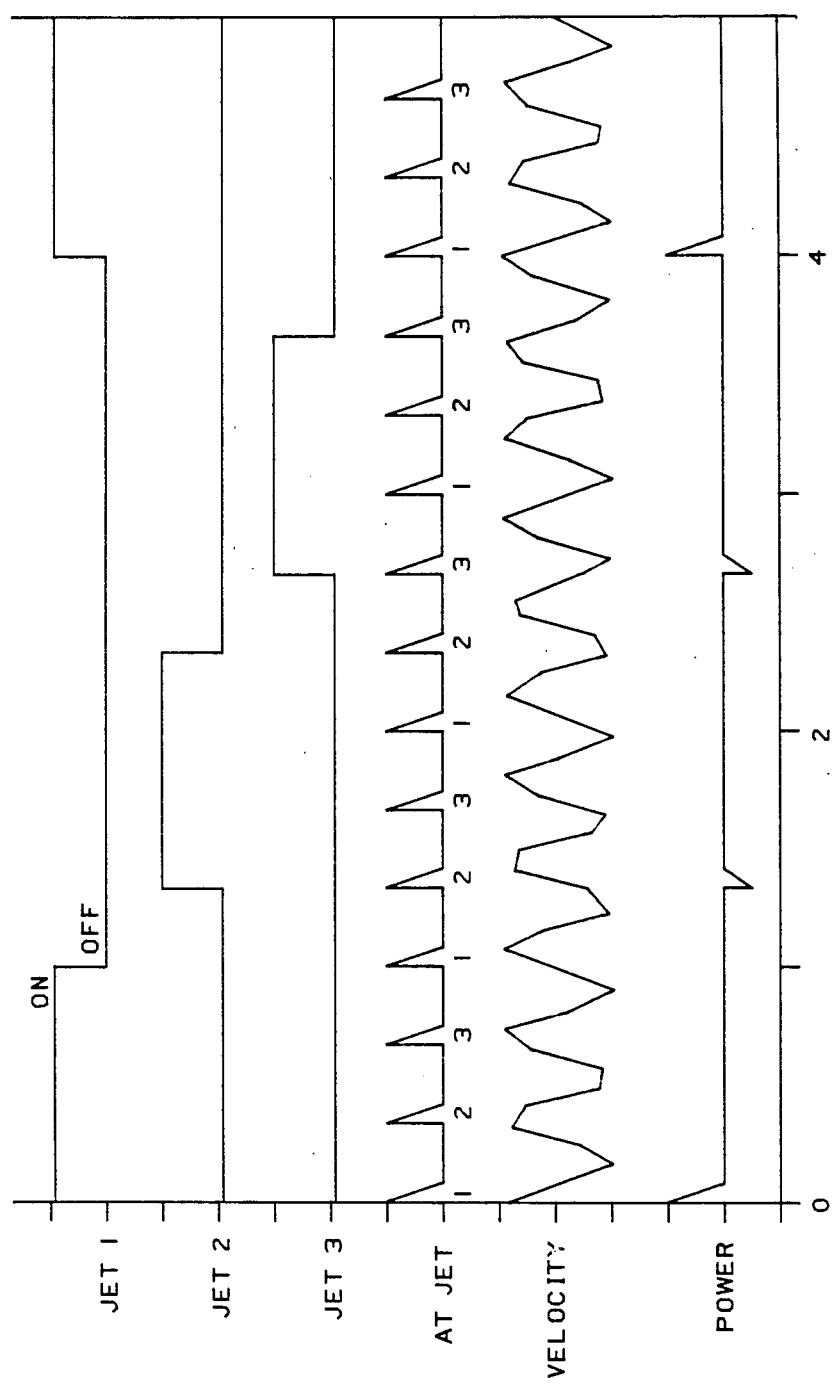
Figure 7:
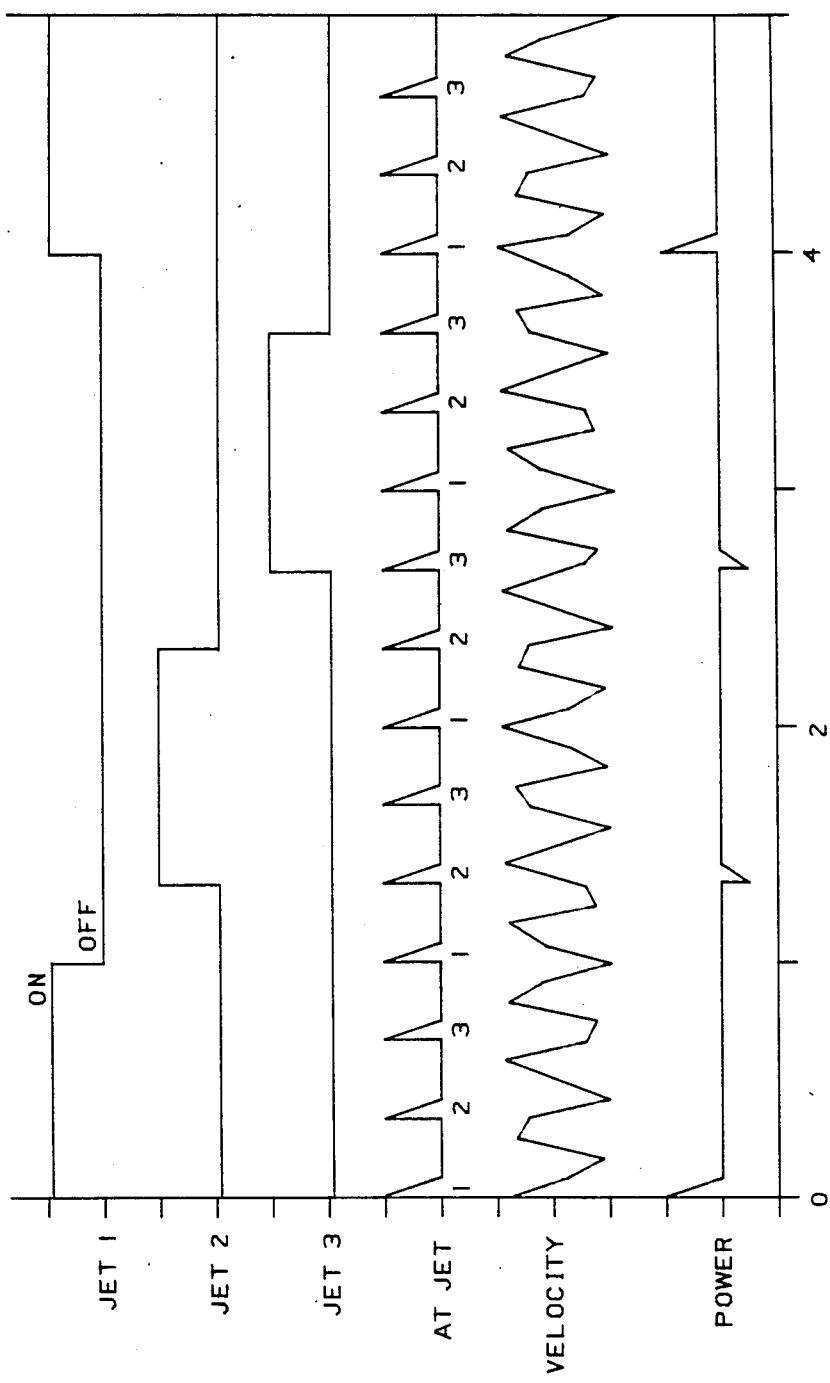

For example, when J=+0.25, completion of one jet cycling period will correspond to four revolutions of the rotor and $F_1=0.75R$; $F_2=1.5R$; $F_3=2.25R$; $F_4=3.00R$; $F_5=3.75R$; $F_6=4.50R$; etc. FIGS. 3, 4 and 5 are timing diagrams corresponding to $F_1$, $F_3$ and $F_6$ respectively. FIGS. 6 and 7 illustrate blade response at values of F for which n is a non-integer, i.e., n=2.75 and n=3.50. Generally, in FIGS. 3–7, the upper three plots labeled Jet 1, Jet 2 and Jet 3 illustrate the on-off cycling of the jets 16 as their respective valves are opened and closed by controller 28 command signals. The next lower plot labeled "At Jet" in each figure indicates the time at which a single selected blade passes each jet. The plot labeled "VELOCITY" indicates the velocity response of the blade tip to the vibratory excitations induced by the fluid stream or fluid pulse from the jets. The plot labeled "POWER" indicates power input, i.e., energy transferred to the blade from each fluid pulse's impact with the blade as a function of time. In FIGS. 3–5 each power input coincides with a peak positive blade tip velocity indicating reinforcement of the blade excitation frequency. On the other hand, in FIGS. 6 and 7 some of the power inputs do not reinforce the blade excitation frequency, as indicated by inverted pulses in the power plots, but rather occur at times such that blade vibration energy is reduced.

FIG. 8 is a table of vibratory frequencies and harmonics thereof which may be generated based on various apparent jet rotational velocities. By monitoring blade vibration for sequential values of J, several overlapping series of $F_n$ may be inspected with a blade vibration monitor for resonant responses. While FIG. 8 illustrates the overlapping values of $F_n$ which may be had for a few values of J. In order to confidently resolve the center frequency of each blade resonance, J must be varied in small incremental steps. For example, it has been found that sufficient resolution will be had in order to identify the center frequency of every resonance above the fifth harmonic if J is varied from −0.1 to +0.1 of rotor speed in incremental steps of 0.1 percent speed.

Thus a comprehensive characterization of blade resonances over a desired frequency range can be had by incrementally exciting the blades with various vibration frequencies $F_n$ and monitoring the blades for resonant responses.

A novel system and method have been presented for exciting the rotating blades of a turbomachine with selectable vibration frequencies. A method has also been illustrated for performing a comprehensive characterization of blade resonant frequencies in a machine under normal operating conditions. It is contemplated that changes in the components and arrangement of components in the novel system as well as changes in the precise steps of the inventive methods and the order of such steps may be made by those having ordinary skill in the art without departing from the spirit of the invention or the scope of the invention as set forth in the claims which follow.

We claim:

1. A method for on-line testing of turbine blades for fatigue in a steam turbine under operating conditions in which the turbine blades are connected for driving a rotatable shaft in response to a flow of high-pressure, high-temperature steam impinging on the blades, radially outer tips of the blades passing in a path adjacent an inner surface of a casing of the turbine, the method comprising the steps of:

providing at least one steam jet extending through the casing adjacent the outer tips of the blades, the steam jet including an inlet for connection to a pressurized steam source, a nozzle connected to the inlet for directing steam toward the blades, a valve for selectively admitting steam to the nozzle and an actuator for controlling the valve;

selectively energizing the actuator for causing pulses of steam from the pressurized source to impact upon and vibrationally excite selected ones of the blades at predetermined frequencies;

determining the ones of the blades excited by the pulses of steam;

providing vibration measuring apparatus operatively associated with the blades for determining the amplitude of any vibration of a blade;

measuring with the vibration measuring apparatus the amplitude of vibration induced in the excited ones of the blades at the predetermined excitation frequencies;

determining resonant frequencies of the blades from the amplitude of vibration; and identifying fatigued blades from shifts in resonant frequencies.

2. A method for on-line testing of turbine blades in a steam turbine operating at a constant shaft rotational velocity, the blades being attached at a radially inner end to a radially outer surface of a rotor disk, radially outer tips of the blades passing in a path adjacent an inner surface of casing of the turbine, the method comprising providing a plurality of spaced steam jets arranged circumferentially about the row of blades and fixedly attached with respect to the casing, each of the jets including an inlet for connection to a high pressure steam source, a nozzle connected to the inlet for directing pulses of steam into the blade path, a valve for opening and closing the nozzle and an actuator for controlling the valve;

selectively energizing the actuator of each of the jets for causing pulses of steam to impact the blades at predetermined frequencies; and measuring vibration of the blade tips for determining resonant frequencies of the blades.

3. The method of claim 2 wherein the blades are excited at a plurality of selectable frequencies for determining a plurality of resonant vibration inducing frequencies.

4. The method of claim 2 and including the step of controlling individually the fluid jets for exciting the blades at a plurality of selectable frequencies.

5. The method of claim 2 wherein at least two jets are controlled to excite the blades during alternate periods of blade rotation in order to induce blade resonances.

6. The method of claim 2 wherein resonant frequencies of individual blades are detected by monitoring the positions of tips of individual blades in a blade row with a plurality of sensors disposed about the blade row wherein each sensor provides output signals responsive to the passage of individual blades.

* * * * *